United States Patent
Kong et al.

(10) Patent No.: US 10,257,160 B2
(45) Date of Patent: Apr. 9, 2019

(54) METHOD AND SYSTEM FOR RESOLVING INTERNET OF THINGS HETEROGENEOUS IDENTIFIERS

(71) Applicant: Computer Network Information Center, Chinese Academy of Sciences, Beijing (CN)

(72) Inventors: Ning Kong, Beijing (CN); Shuo Shen, Beijing (CN); Bing Liu, Beijing (CN); Xiaodong Li, Beijing (CN); Xiangyang Huang, Beijing (CN)

(73) Assignee: Computer Network Information Center, Chinese Academy of Sciences, Beijing (CN)

( * ) Notice: Subject to any disclaimer, the term of this patent is extended or adjusted under 35 U.S.C. 154(b) by 440 days.

(21) Appl. No.: 14/894,666

(22) PCT Filed: Dec. 18, 2013

(86) PCT No.: PCT/CN2013/089849
§ 371 (c)(1),
(2) Date: Nov. 30, 2015

(87) PCT Pub. No.: WO2015/032155
PCT Pub. Date: Mar. 12, 2015

(65) Prior Publication Data
US 2016/0182446 A1 Jun. 23, 2016

(30) Foreign Application Priority Data
Sep. 9, 2013 (CN) .......................... 2013 1 0407613

(51) Int. Cl.
*G06F 15/16* (2006.01)
*H04L 29/12* (2006.01)
*H04L 29/06* (2006.01)

(52) U.S. Cl.
CPC .......... *H04L 61/3005* (2013.01); *H04L 61/10* (2013.01); *H04L 69/08* (2013.01);
(Continued)

(58) Field of Classification Search
CPC .. H04L 65/4069; H04L 61/3005; H04L 61/10
(Continued)

(56) References Cited

PUBLICATIONS

S. Jeong et al., "Enabling Transparent Communication with Global ID for the Internet of Things," 2012 Sixth International Conference on Innovative Mobile and Internet Services in Ubiquitous Computing, Palermo, 2012, pp. 695-701.*

(Continued)

*Primary Examiner* — Melvin H Pollack
*Assistant Examiner* — Messeret F Gebre
(74) *Attorney, Agent, or Firm* — SV Patent Service

(57) ABSTRACT

The present invention relates to a method and system for resolving Internet of Things heterogeneous identifiers. The method provides a special description mechanism for a resolution protocol for an Internet of Things heterogeneous identifiers, which not only forms a heterogeneous identification coding rule corresponding to the heterogeneous identifier, but also accordingly forms a corresponding heterogeneous identification resolution protocol rule, and conducts registration binding on the above-mentioned rules and the corresponding Internet of Things heterogeneous identifier. By resolving and querying standard identification code corresponding to the Internet of Things heterogeneous identification, the disclosed method can obtain the bound heterogeneous identification coding rule and heterogeneous identification resolution protocol rule. Thus the Internet of Things heterogeneous identifier can be transformed into a unified Internet of Things heterogeneous identifier including the coding rules and the resolution protocol, which allows initiating a correct Internet of Things identification query for a corresponding resolution server by reading rule information therein and adopting a corresponding resolution proto- (Continued)

col. The present invention can achieve resolving common query of various Internet of Things heterogeneous identifiers based on different coding rules and different resolution protocols.

10 Claims, 2 Drawing Sheets

(52) U.S. Cl.
CPC .......... *H04L 69/22* (2013.01); *H04L 61/1511* (2013.01); *H04L 61/303* (2013.01)

(58) Field of Classification Search
USPC .................................................. 709/217, 245
See application file for complete search history.

(56) References Cited

PUBLICATIONS

Euihyun Jung, Younghwan Choi, Jun Seob Lee and Hyoung Jun Kim, "An OID-based identifier framework supporting the interoperability of heterogeneous identifiers," 2012 14th International Conference on Advanced Communication Technology (ICACT), PyeongChang, 2012, pp. 304-308.*

C. H. Jung, Y. K. Kwag and W. Y. Song, "CFAR detection algorithm for ground target in heterogeneous clutter using high resolution SAR image," 2011 3rd International Asia-Pacific Conference on Synthetic Aperture Radar (APSAR), Seoul, 2011, pp. 1-4. (Year: 2011).*

Pebesma, Edzer, "INTAMAP: the design and implementation of an interoperable automated interpolation web service", vol. 37, issue 3, pp. 343-352, 2012 (Year: 2012).*

K. Nagothu, T. Shaneyfelt, P. Benavidez, M. A. Jordens, S. kota and M. Jamshidi, "Systems of Systems Communication for heterogeneous independent operable systems," 2009 IEEE International Conference on System of Systems Engineering (SoSE), Albuquerque, NM, 2009, pp. 1-6. (Year: 2009).*

* cited by examiner

METHOD AND SYSTEM FOR RESOLVING INTERNET OF THINGS HETEROGENEOUS IDENTIFIERS

TECHNICAL FIELD

The invention belongs to the field of computer network technology, and in particular, to a method related to resolving heterogeneous identifiers for Internet of Things, and system for applying such method.

BACKGROUND OF THE INVENTION

The Internet of Things (IoT) is closely linked to the physical world and its importance will far exceed the current Internet. IoT identifiers will also become more important than the Internet domain names of information resources. It will be difficult for IoT identifiers to follow Internet's domain management model of assignment by unified global organization. IoT identifiers will be assigned and managed by multiple countries or agencies based on different coding standards. Currently, IoT identifiers coding system consists mainly of EPC code proposed by EPCglobal in the United States (Electric Product Code), uCode code (Ubiquitous Code) proposed by uID Center of Japan, mRFID Code (Mobile RFID Code, mobile RFID code) presented by Korean TTA (Telecommunications Technology Association, Telecommunications Technology Association), Handle code proposed by the international organization DONA (Digital Object Numbering Authority), OID codes (Object Identifier) proposed by the international organization ISO/IEC, as well as the CPC code (Commerce Product Code) proposed by the Ministry of Commerce of China. With the development of future IoT, more IoT identification codes will emerge. For example, The Article Numbering Center of China is developing Ecode (Entity code), which will further exacerbate the level of heterogeneity in IoT identifiers, which results in that IoT identification resolution system faces serious conflicts in heterogeneous coding.

Further, since IoT identifiers have different code standards, the resolution protocols corresponding to IoT identifiers are also not the same. For example, EPC, mRFID Code, OID, and CPC codes all use identification resolution protocol similar to DNS, while uCode adopts a proprietary identifications resolution protocol similar to DNS. On the other hand, Handle uses Handle System agreement to resolve IoT identifiers which is completely different from DNS. Ecode has not yet clearly specified its resolution protocol. The IoT identifiers that emerge in the future may also adopt new or customized unique identification resolution protocols. Thus, IoT identifiers have heterogeneous conflicts not only in identification coding, but also in corresponding heterogeneous identification resolution protocols, making it impossible to reach a unified resolution between different IoT identification resolution protocols.

The current global IoT applications are mostly closed loop applications for specific industries or companies, which commonly use particular IoT identification coding rules and identification resolution protocols, and each depending on the specific IoT applications. As a result, existing IoT applications often cannot directly communicate with each other, which not only affects user experience, but also inhibits development of large-scale IoT applications. Therefore, it is of great significance to develop a unified heterogeneous IoT identification code and an IoT identification resolution system compatible with any heterogeneous IoT identification resolution systems, in order to address the conflicts in identification coding and corresponding heterogeneous identification resolution protocols, and to provide a common identification resolution for IoT identifiers, to promote large-scale development of various IoT applications.

Recent studies related to heterogeneous conflicts in IoT identification resolutions are as follows:

As mentioned earlier, the current IoT identification coding systems include EPC, uCode, mRFID Code, Handle OID, CPC, etc., and each IoT identification coding system corresponding to different identification resolution protocol. Currently there are three main types of IoT identification resolution protocols, namely DNS protocol, DNS-like protocol, and Handle System protocol. More IoT identifiers and corresponding identification resolution protocols will emerge in the future. The currently available IoT resolution systems support only a single type identifier and identification resolution protocol, and are not sufficiently compatible with a variety of heterogeneous identification codes and identification resolution protocols. For example, ONS (Object Name Service) proposed by EPCglobal in the United States is based entirely on existing Internet DNS protocol, which only supports resolution of EPC codes. ucodeRP (ucode Resolution Protocol) proposed by uID Center of Japan uses a proprietary resolution protocol that is similar to DNS protocol, also only can only support resolution of uCode code. Handle code by DONA is based on the Handle protocol, which is completely incompatible with the DNS protocol, and only supports Handle code resolution.

The present applicant carried out research in early 2005 related to resolving conflicts in heterogeneous IoT identifiers to achieve unified IoT identifier coding and resolution. Based on this research, patent application "A method and system for addressing Things" was filed in 2008, and granted on Apr. 17, 2013 (patent number: ZL200810239867.7). However, this method only supports IoT identifiers for domain name protocols but does not support heterogeneous IoT identification resolution, and has not addressed the problem of conflicts in heterogeneous IoT identification and resolution protocols.

RNS is further refined to patent ZL200810239867.7 by specifically proposing a two-segment mechanism for IoT identification resolution. This mechanism designs IoT identifiers including a standard code and an item code. The related identification resolution protocol includes two corresponding logic portions respectively for resolving standard code and the item code. The former is responsible for conversion rules for resolving standard code into domain identification based on DNS resolution protocol, and using such conversion rules to resolve IoT identifiers into the corresponding domain address. Because this mechanism is a detailed implementation to patent ZL200810239867.7, it also cannot solve the problem of conflicts in heterogeneous IoT identifiers and resolution protocols, and does not support heterogeneous IoT identification resolution.

International organizations ISO/IEC and ITU-T have proposed a similar solution, which utilizes OID (Object IDentifier) as the standard code prefix for unifying IoT identifiers. The OID resolution system based on DNS design can achieve conversions and resolution of heterogeneous IoT identification, and solve the problem of conflicts in heterogeneous IoT identifiers. The proposal can be considered as a concrete implementation of patent ZL200810239867.7 based on OID, which similarly did not consider supporting heterogeneous IoT identification resolution protocol either.

University of Helsinki, Finland has constructed DIALOG (Distributed Information Architectures for collaborative LOGistics) system based ID@ URI mechanism, which separates IoT identifiers into two parts: ID and URI, which are separated by identifier "@". The URI section is based on resolution of DNS protocol. The ID section format is to be specified by managers in the specific fields, which needs to be unique within URI to assure unique global IoT identifiers. The ID@URI mechanism utilizes existing DNS resolution service. Because the mechanism is entirely dependent on DNS resolution protocol, it also cannot support other non-DNS IoT protocols.

Thus, the current efforts are focused on solving conflicts in heterogeneous IoT identification code level. The basic idea is to identify transcoding rule for resolution, two-segment resolution, or resolution mechanism based on URI or OID, to convert heterogeneous IoT identifiers into a particular identification code based on a specific resolution protocol (such as DNS protocol), and then to resolve the particular identifier using a specific resolution protocol, thus enabling compatibility in resolutions of heterogeneous IoT identifiers. Since the current studies did not fully consider the conflicts between heterogeneous IoT resolution protocols, existing solutions can only provide heterogeneous IoT identifiers that follow a certain specific IoT resolution protocol; they cannot provide resolution support to IoT identifications that follow different IoT resolution protocols. Thus the current studies have only partially solved the conflict problem in heterogeneous IoT identifier resolution.

SUMMARY OF THE INVENTION

Existing solutions can only provide heterogeneous IoT identifiers that follow a certain specific IoT resolution protocol. When IoT user resolves a heterogeneous identifier, it must know in advance which IoT identification resolution protocol that the heterogeneous identifier is based on, and to visit the resolution server that supports such IoT identification resolution protocol in order to provide IoT identification resolution services to resolve heterogeneous identifiers, which is inconvenient to IoT users. It is difficult for IoT users to achieve for heterogeneous IoT identification resolution using unfamiliar identification resolution protocols, especially given the large number of already proposed and additional newly emerging heterogeneous IoT resolution protocols.

To address these drawbacks, the present invention is intended to be used by IoT applications for heterogeneous IoT identifiers that are based on any resolution protocols (such as DNS, ONS, ucodeRP, Handle System, and other custom protocols, etc.), to provide a common resolution methods for IoT identifiers. The present method provides IoT users resolution protocol for IoT identifiers based on any heterogeneous resolution protocol. The present method provides IoT users a common IoT identification resolver to accomplish IoT identifier queries for heterogeneous IoT identification resolution protocols, which can serve as a unified resolution entry point for the future IoT users.

To achieve the above object, the present invention adopts the following technical scheme:

A method for resolving heterogeneous Internet of Things identifiers, comprising the steps of:

1) assigning a unique standard identification code to a heterogeneous Internet of Things (IoT) identifier according to identification resolution protocol;

2) establishing a description mechanism for the identification resolution protocol, wherein the description mechanism is configured to be recognized and processed by a heterogeneous IoT identification resolver; and based on the description mechanism, generating a heterogeneous IoT identification resolution protocol based on the identification resolution protocol corresponding to the heterogeneous IoT identifier;

3) bundling and registering the standard identification code in step 1) and the heterogeneous IoT identification resolution protocol in step 2) in a standard identification resolution server;

4) converting the standard identification code in step 1) into a first unified IoT identifier based on the heterogeneous IoT identification resolution protocol;

5) using the first unified IoT identifier in step 4), by the heterogeneous IoT identification resolver, to initiate a query to a standard identification resolution server corresponding to the heterogeneous IoT identification resolution protocol;

6) returning the heterogeneous IoT identification resolution protocol from the standard identification resolution server to the heterogeneous IoT identification resolver;

7) converting the heterogeneous IoT identifier based on the heterogeneous IoT identification resolution protocol in step 6), by the heterogeneous IoT identification resolver, into a second unified IoT identifier;

8) using the second unified IoT identifier produced in step 7), to query a heterogeneous IoT identification resolution server specified in the heterogeneous IoT identification resolution protocol; and 9) using the second unified IoT identifier produced in step 7), returning to the heterogeneous IoT identification resolver, registration information corresponding to the heterogeneous IoT identifier.

A system for resolving heterogeneous Internet of Things (IoT) identifiers, comprising: a standard identification resolution server; a heterogeneous IoT identification resolver; and a heterogeneous IoT identification resolution server, wherein the standard identification resolution server is configured to store and provide a standard identification code corresponding to a heterogeneous IoT identifier, and associated bundled heterogeneous IoT identification resolution protocol, wherein the heterogeneous IoT identification resolver is configured to convert the standard identification code into a first unified IoT identifier, to initiate a query to the standard identification resolution server, to convert the heterogeneous IoT identification based on the heterogeneous IoT identification resolution protocol into a second unified IoT identification, and to query a heterogeneous IoT identification resolution server specified in the heterogeneous IoT identification resolution protocol, and wherein the heterogeneous IoT identification resolution server is configured to return, to the heterogeneous IoT identification resolver, registration information corresponding to the heterogeneous IoT identifier.

The above-described methods and systems are applicable to queries based on different resolution protocols. Based on the described method and system, the present invention further provides a solution for both different coding rules and different resolution protocols for heterogeneous IoT identification resolution, as follows:

A method for resolving heterogeneous Internet of Things identifiers, comprising the steps of:

1) assigning a unique standard identification code to a heterogeneous Internet of Things (IoT) identification according to coding rules and identification resolution protocol;

2) establishing a description mechanism for the coding rules and the identification resolution protocol, wherein the description mechanism is configured to be recognized and processed by a heterogeneous IoT identification resolver;

and based on the description mechanism, generating heterogeneous IoT identification coding rules and resolution protocol based on the coding rules and identification resolution protocol corresponding to the heterogeneous IoT identifier;

3) bundling and registering the standard identification code in step 1) and the heterogeneous IoT coding rules and identification resolution protocol in step 2) by a standard identification resolution server;

4) converting the standard identification code in step 1) into a first unified IoT identifier based on the heterogeneous IoT coding rules and identification resolution protocol;

5) using the first unified IoT identification in step 4), by the heterogeneous IoT identification resolver, to initiate a query to a standard identification resolution server corresponding to the heterogeneous IoT coding rules and identification resolution protocol;

6) returning the heterogeneous IoT identification resolution protocol from the standard identification resolution server to the heterogeneous IoT identification resolver;

7) converting the heterogeneous IoT identifier based on the heterogeneous IoT coding rules and identification resolution protocol in step 6), by the heterogeneous IoT identification resolver, into a second unified IoT identifier;

8) using the second unified IoT identifier produced in step 7) by the heterogeneous IoT identification resolver, to query a heterogeneous IoT identification resolution server specified in the heterogeneous IoT identification resolution protocol; and 9) using the second unified IoT identifier produced in step 7), returning to the heterogeneous IoT identification resolver, registration information corresponding to the heterogeneous IoT identifier.

A system for resolving Internet of Things (IoT) heterogeneous identification, comprising: a standard identification resolution server; a heterogeneous IoT identification resolver; and a heterogeneous IoT identification resolution server, wherein the standard identification resolution server is configured to store and provide a standard identification code corresponding to a heterogeneous IoT identifier, and associated bundled heterogeneous IoT coding rules and identification resolution protocol, wherein the heterogeneous IoT identification resolver is configured to convert the standard identification code into a first unified IoT identifier, to initiate a query to the standard identification resolution server, to convert the heterogeneous IoT identification based on the heterogeneous IoT coding rules and identification resolution protocol into a second unified IoT identifier, and to query a heterogeneous IoT identification resolution server specified in the heterogeneous IoT identification resolution protocol, and wherein the heterogeneous IoT identification resolution server is configured to return, to the heterogeneous IoT identification resolver, registration information corresponding to the heterogeneous IoT identifier.

Further, the above method, the registration information in step 9) includes an address for an IoT information server corresponding to the heterogeneous IoT identifier.

Further, the above scenario, the first unified IoT identifier converted from the standard identification code includes one or more of the following fields: name of the resolution protocol, entry address of the resolution server following the resolution protocol, server port number, the standard identification code converted according to the coding rules, as well as query type of the resolution protocol.

Further, the above scenario, the second unified identifier converted from the heterogeneous IoT identifier includes one or more of the following fields: name of the resolution protocol, entry address of the server following the resolution protocol, server port number, the standard identification code converted by the coding rules, as well as query type of the resolution protocol.

The present invention provides a description mechanism dedicated to resolution protocols for heterogeneous IoT identifier, and protocol for heterogeneous IoT resolution. Registration and binding of such protocol and the corresponding heterogeneous IoT identifier allow them to be used in resolving IoT identifiers. The present method also proposes a unified IoT identifier using an embedded IoT identification resolution protocol. By querying IoT resolution for a standard identification code, user can not only obtain coding rules for the heterogeneous IoT identifier, but more importantly also the corresponding heterogeneous identification coding rules and resolution protocol. Using this rule, heterogeneous IoT identifier can be converted into a unified IoT identifier that includes information for IoT identification resolution protocol (such as resolution protocol name, entry port address for the resolution server, the port number resolution server, query type in resolution protocol, etc.). A heterogeneous IoT identification resolver can identify the IoT identification resolution protocol in the unified IoT resolver, and can initiate correct query for IoT identification resolution based on the IoT identification resolution protocol corresponding to the heterogeneous IoT resolver.

Compared with conventional technologies, the present invention include one or more of the following advantages:

1) For the service providers of IoT identification resolution, the present method provides a unified query entry point for heterogeneous IoT identification resolutions based on different coding rules and different resolution protocols;

2) For users that query the IoT identification resolutions, the present method provides a resolution server for heterogeneous IoT identification resolutions based on different coding rules and different resolution protocols. The present method does not install different resolution servers for different resolution protocols;

3) As the IoT industry is concerned, a heterogeneous IoT identification resolution method that is compatible with different coding rules and different resolution protocols can enable equal interconnection between applications based on different heterogeneous IoT identification, thus contributing to achieving the goal of cross-border IoT interoperability.

DETAILED DESCRIPTION OF THE INVENTION

The present invention is now described in detail by the following specific examples and drawings.

Example 1

Figure 1:
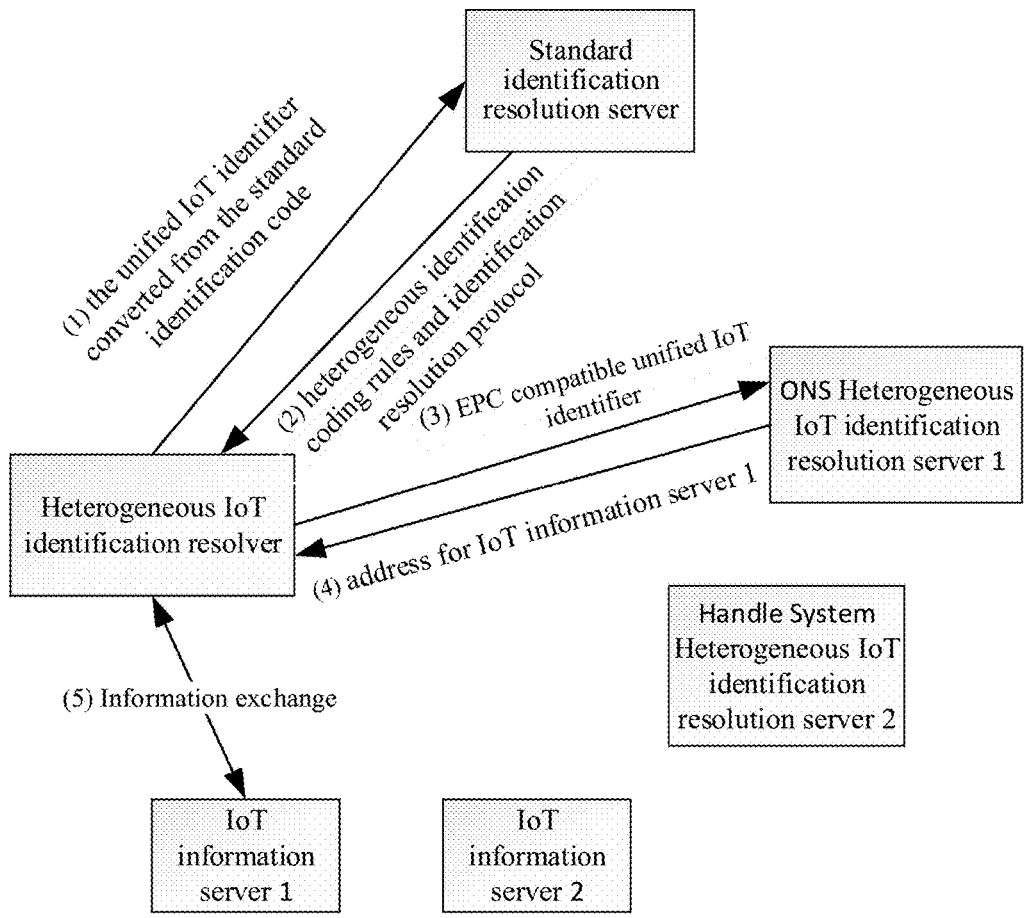
FIG. 1 is a schematic diagram showing a system for heterogeneous IoT identification resolution using EPC ONS in Example 1.

The process of heterogeneous IoT identification resolution in the present example is shown in FIG. 1. The hypothetical EPC code for identification resolution is 123456789, and the standard identification code assigned to it is 001 (these codes are for illustration purpose only; the present invention is not limited thereto and may use other forms of standard identification code), the standard identification code is converted into a compatible unified IoT identifier according to the default standard identification coding rules and standard identification resolution protocol: DNS://niot.cn:53/1.0.0.snsroot.cn?type=NAPTR. Specific resolution steps are described as follows:

1) A heterogeneous IoT identification resolver converts the standard identification code to a first unified IoT identifier based on a specific IoT identification resolution protocol, namely, DNS://niot.cn:53/1.0.0.snsroot.cn?type=NAPTR. The conversion is conducted to according to the preset standard identification coding rules and standard identification resolution protocol in the resolver. The heterogeneous IoT identification resolver sends a query to a standard identification resolution server corresponding to the first unified IoT identifier.

In the first unified IoT identifier, "DNS://" indicates the name resolution protocol, the present example relates to DNS protocol; "niot.cn" represents the entry address for the server following DNS protocol; ":53" indicates that the server port number; "./1.0.0.snsroot.cn" refers to standard identification code after conversion according to the coding rules; "?type=NAPTR" indicates the type of resolution protocol queried, that is, the type of resolution data type that is being queried.

2) The standard identification resolution server returns, to the heterogeneous IoT identification resolver, the heterogeneous identification coding rules and heterogeneous identification resolution protocol corresponding to EPC 123456789. Note: the description mechanism adopted by the rules must be recognizable and can be processed by the heterogeneous IoT identification resolver. For example: the description mechanism can employ a regular expression, or a standard format such as XML or JSON.

a) Using the example of a regular expression, the heterogeneous identification resolution protocol can be described as follows: the name of the resolution protocol "://". The entry address of the resolution server. ":". The port number of the resolution server"./".\0. "?". The name of the resolution protocol query type"."="." value of the resolution protocol query type".

b) The description mechanism for heterogeneous coding rules is similar as above.

3) The heterogeneous IoT identification resolver converts the heterogeneous IoT identifier into a second unified IoT identifier compatible with EPC ONS resolution protocol according to heterogeneous IoT identification coding rules and heterogeneous identification resolution protocol. For example, EPC code 123456789 is converted to: ONS://epcons.cn:53/789.3456.12.epc.com?type=NAPTR. The heterogeneous IoT identification resolver sends a query to the ONS heterogeneous IoT identification resolution server according to the second unified IoT identifier.

In the second unified IoT identifier, "ONS://" indicates the name of the resolution protocol, with the example being ONS resolution protocol; "epcons.cn" indicates the entry address of the server that follows ONS protocol; ":53" indicates that the server port number; "/789.3456.12.epc.com" is the EPC code after conversion based on the coding rules; "?type=NAPTR?" indicates the type of resolution protocol query, that is the which data type that the query is after.

4) The ONS heterogeneous IoT identification resolution server returns registration information (the address for IoT information server 1) associated with the heterogeneous IoT identification to the heterogeneous IoT identification resolver.

5) Using the address for IoT information server 1, the heterogeneous IoT identification resolver exchanges information with the IoT information server 1.

Example 2

Figure 2:
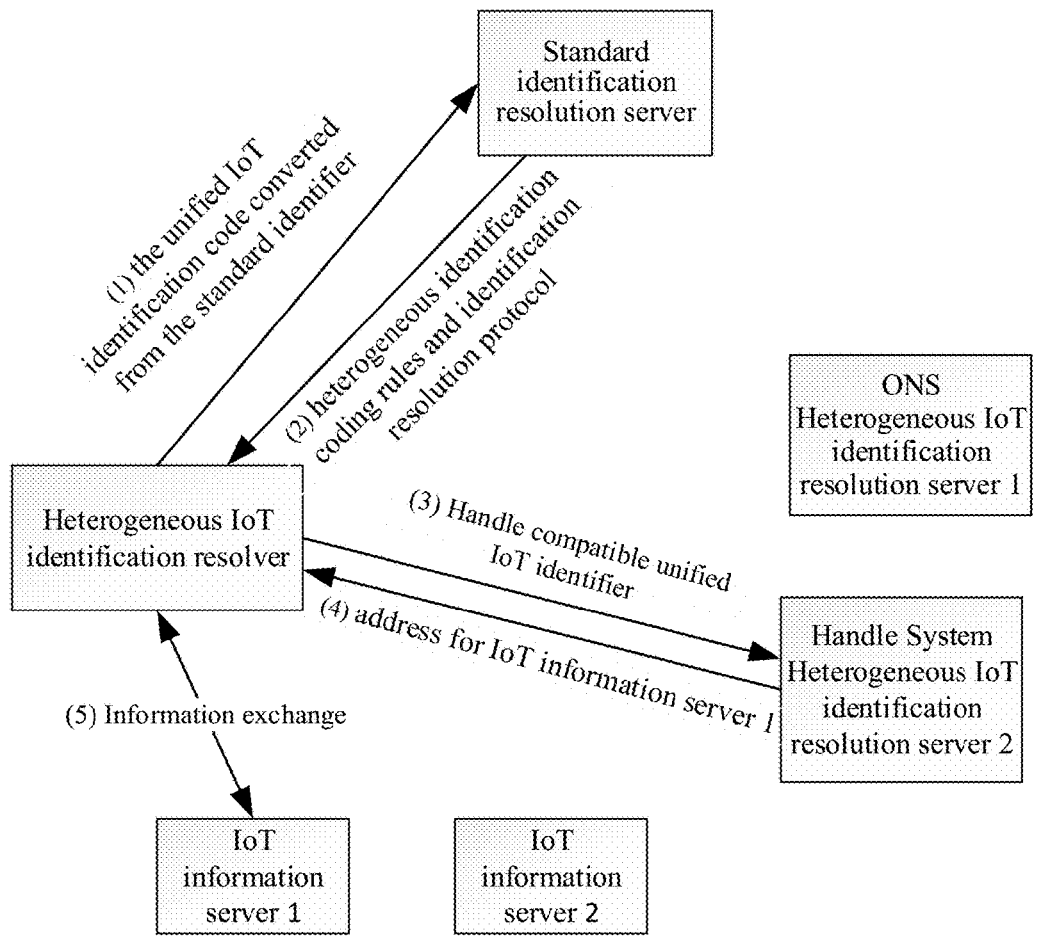
FIG. 2 is a schematic diagram showing a system for heterogeneous IoT identification resolution using Handle System in Example 2.

The process of heterogeneous IoT identification resolution in the present example is shown in FIG. 2. The hypothetical Handle code for identification resolution is 10.123/456, and the standard identification code assigned to it is 002. The standard identification code is converted into a first unified IoT identifier according to the default standard identification coding rules and standard identification resolution protocol: DNS:"niot.cn:53/2.0.0.snsroot.cn?type=NAPTR. Specific resolution steps are described as follows:

1) A heterogeneous IoT identification resolver converts the standard identification code to a first unified IoT identifier based on a specific IoT identification resolution protocol, namely, DNS://niot.cn:53/2.0.0.snsroot.cn?type=NAPTR. The conversion is conducted to according to the preset standard identification coding rules and standard identification resolution protocol in the server. The meanings of the different fields of the first unified IoT identifier are the same as in Example 1. The heterogeneous IoT identification resolver sends a query to a standard identification resolution server corresponding to the first unified IoT identifier.

2) The standard identification resolution server returns, to the heterogeneous IoT identification resolver, the heterogeneous identification coding rules and heterogeneous identification resolution protocol corresponding to the Handle code 10.123/456.

3) The heterogeneous IoT identification resolver converts the heterogeneous IoT identification into a second unified IoT identifier compatible with Handle System resolution protocol according to heterogeneous IoT identification coding rules and heterogeneous identification resolution protocol. For example, the Handle code 10.123/456 is converted to: HandleSystem://123.45.67.8: 2641/10.123/456?type=URL. The meanings of the different fields of the second unified IoT identifier are the same manner as in Example 1. The heterogeneous IoT identification resolver sends a query to the Handle System heterogeneous IoT identification resolution server according to the second unified IoT identifier.

4) The Handle System heterogeneous IoT identification resolution server returns registration information (the address for IoT information server 2) associated with the heterogeneous IoT identifier to the heterogeneous IoT identification resolver.

5) Using the address for IoT information server 2, the heterogeneous IoT identification resolver exchanges information with the IoT information server 2.

The above implementation examples are provided merely to illustrate, rather than to limit it, the technical solutions of the present invention. One of ordinary skill in the art may modify or vary the disclosed implementations without departing from the spirit and scope of the present invention. The scope of the present invention should be subject to the claims.

What is claimed is:

1. A method for resolving heterogeneous Internet of Things identifiers, comprising the steps of:
   1) assigning a unique standard identification code to a heterogeneous Internet of Things (IoT) identification according to an identification resolution protocol selected from multiple identification resolution protocols;
   2) establishing a description mechanism for the identification resolution protocol, wherein the description mechanism is configured to be recognized and processed by a heterogeneous IoT identification resolver; and based on the description mechanism, generating a heterogeneous IoT identification resolution protocol based on the identification resolution protocol corresponding to a heterogeneous IoT identifier;
   3) bundling and registering the unique standard identification code in step 1) and the heterogeneous IoT identification resolution protocol in step 2) in a standard identification resolution server;
   4) converting the unique standard identification code in step 1) into a first unified IoT identifier based on the heterogeneous IoT identification resolution protocol;
   5) using the first unified IoT identifier in step 4), by the heterogeneous IoT identification resolver, to initiate a query to a standard identification resolution server corresponding to the heterogeneous IoT identification resolution protocol;
   6) returning the heterogeneous IoT identification resolution protocol from the standard identification resolution server to the heterogeneous IoT identification resolver;
   7) converting the heterogeneous IoT identifier based on the heterogeneous IoT identification resolution protocol in step 6), by the heterogeneous IoT identification resolver, into a second unified IoT identifier;
   8) using the second unified IoT identifier produced in step 7), to query a heterogeneous IoT identification resolution server specified in the heterogeneous IoT identification resolution protocol; and
   9) using the second unified IoT identifier produced in step 7), returning to the heterogeneous IoT identification resolver, registration information corresponding to the heterogeneous IoT identifier.

2. A method for resolving Internet of Things heterogeneous identifiers, comprising the steps of:
   1) assigning a unique standard identification code to a heterogeneous Internet of Things (IoT) according to coding rules and an identification resolution protocol selected from multiple identification resolution protocols;
   2) establishing a description mechanism for the coding rules and the identification resolution protocol, wherein the description mechanism is configured to be recognized and processed by a heterogeneous IoT identification resolver; and based on the description mechanism, generating heterogeneous IoT identification coding rules and resolution protocol based on the coding rules and the identification resolution protocol corresponding to a heterogeneous IoT identifier;
   3) bundling and registering the unique standard identification code in step 1) and the heterogeneous IoT coding rules and identification resolution protocol in step 2) by a standard identification resolution server;
   4) converting the unique standard identification code in step 1) into a first unified IoT identifier based on the heterogeneous IoT coding rules and identification resolution protocol;
   5) using the first unified IoT identification in step 4), by the heterogeneous IoT identification resolver, to initiate a query to the standard identification resolution server corresponding to the heterogeneous IoT coding rules and identification resolution protocol;
   6) returning the heterogeneous IoT identification resolution protocol from the standard identification resolution server to the heterogeneous IoT identification resolver;
   7) converting the heterogeneous IoT identifier based on the heterogeneous IoT coding rules and identification resolution protocol in step 6), by the heterogeneous IoT identification resolver, into a second unified IoT identifier;
   8) using the second unified IoT identifier produced in step 7) by the heterogeneous IoT identification resolver, to query a heterogeneous IoT identification resolution server specified in the heterogeneous IoT identification resolution protocol; and
   9) using the second unified IoT identifier produced in step 7), returning to the heterogeneous IoT identification resolver, registration information corresponding to the heterogeneous IoT identifier.

3. The method of claim 2, wherein the first unified IoT identifier converted from the unique standard identification code in the step 4) includes one or more of the following fields: name of the resolution protocol, entry address of the resolution server following the resolution protocol, server port number, the unique standard identification code converted according to the coding rules, as well as query type of the resolution protocol.

4. The method of claim 2, wherein the second unified identifier converted from the heterogeneous IoT identifier in the step 7) includes one or more of the following fields: name of the resolution protocol, entry address of the server following the resolution protocol, server port number, the unique standard identification code converted by the coding rules, as well as query type of the resolution protocol.

5. The method according to claim 2, wherein the description mechanism is expressed in a regular expression, XML format, or JSON format.

6. The method according to claim 2, wherein the registration information in step 9) includes an address for an IoT information server corresponding to the heterogeneous IoT identifier.

7. A system for resolving Internet of Things (IoT) heterogeneous identifiers, comprising:
   a standard identification resolution server configured to establish a description mechanism for the identification resolution protocol;
   a heterogeneous IoT identification resolver configure to be recognize and process the description mechanism, wherein the heterogeneous IoT identification resolver is configure to generate a heterogeneous IoT identification resolution protocol based on the description mechanism and the identification resolution protocol corresponding to a heterogeneous IoT identifier; and
   a heterogeneous IoT identification resolution server,
   wherein the standard identification resolution server is configured to bundle and register a unique standard identification code and the heterogeneous IoT identification resolution protocol corresponding to a heterogeneous IoT identifier, wherein the identification resolution protocol is one of multiple identification resolution protocols,
   wherein the heterogeneous IoT identification resolver is configured to convert the unique standard identification code into a first unified IoT identifier, to initiate a query to the standard identification resolution server, to convert the heterogeneous IoT identifier based on the heterogeneous IoT identification resolution protocol into a second unified IoT identifier, and to query the heterogeneous IoT identification resolution server specified in the heterogeneous IoT identification resolution protocol,
wherein the heterogeneous IoT identification resolution server is configured to return, to the heterogeneous IoT identification resolver, registration information corresponding to the heterogeneous IoT identifier.

8. The system for resolving Internet of Things (IoT) heterogeneous identification of claim 7, wherein the standard identification resolution server is configured to store and provide the unique standard identification code corresponding to a heterogeneous IoT identifier and associated bundled heterogeneous IoT coding rules and identification resolution protocol, and
wherein the heterogeneous IoT identification resolver is configured to convert the heterogeneous IoT identification based on the heterogeneous IoT coding rules and identification resolution protocol into the second unified IoT identifier, and to query the heterogeneous IoT identification resolution server specified in the heterogeneous IoT identification resolution protocol.

9. The system of claim 8, wherein the first unified IoT identifier converted from the unique standard identification code includes one or more of the following fields: name of the resolution protocol, entry address of the resolution server following the resolution protocol, server port number, the unique standard identification code converted according to the coding rules, as well as query type of the resolution protocol.

10. The system of claim 8, wherein the second unified identifier converted from the heterogeneous IoT identifier includes one or more of the following fields: name of the resolution protocol, entry address of the server following the resolution protocol, server port number, the unique standard identification code converted by the coding rules, as well as query type of the resolution protocol.

* * * * *